Jan. 15, 1929.

J. A. CRONIN 1,699,135

PISTON RING

Filed Feb. 1, 1928

INVENTOR.

James A. Cronin

BY Booth & Booth

ATTORNEYS.

Patented Jan. 15, 1929.

1,699,135

UNITED STATES PATENT OFFICE.

JAMES A. CRONIN, OF BERKELEY, CALIFORNIA.

PISTON RING.

Application filed February 1, 1928. Serial No. 251,060.

My invention relates to piston packing rings and the like of the type in which a plurality of co-operating spring rings are nested or fitted together in a single groove.

One of the objects of the invention is to provide a spring packing ring whose radial bearing pressure against the cylinder wall is approximately uniform. It is an established fact that a single concentric split ring of uniform cross section seldom gives uniform bearing pressure on the cylinder walls, measurements in some cases having shown a maximum of as much as twenty times the mean pressure. My ring, however, reduces such non-uniformity of pressure to a negligible quantity by providing two rings of proper dimensional relationship and resilience arranged one within the other, with their joints approximately 90 degrees apart, so that the points of maximum pressure of one ring are aligned with the points of minimum pressure of the other. By this means, the rings can be made concentric and with uniform cross section, and need not be hammered or otherwise deformed, a process which is objectionable because it tends to increase the residual stresses in the material of the ring.

Another object of the invention is to provide a ring which will retain its efficiency for the greatest possible time, and which is least subject to clogging by carbon or excessive oil and best able to withstand the effects of wear and the stresses resulting from high cylinder pressures. The attainment of this object, which will be referred to later after the construction of my ring has been described, renders the ring peculiarly advantageous for use in engines of the Diesel type, in which the cylinder pressures are high and the deposition of carbon and oil are excessive.

A still further object of the invention is to provide a ring in which leakage is reduced to a minimum. This is accomplished by the separated relation of the joints in the two rings, and by a sealing provision, described in detail hereinafter, which forces any leakage which may occur at the joint in the outer ring to follow a very small and tortuous path.

These and other objects and advantages of the invention will become apparent from the following description, which should be read with the understanding that the form, proportion, and construction of the several parts may be varied, within the limits of the claims hereto appended, without departing from the spirit of the invention. It is also to be understood that my invention, although described and illustrated herein as embodied in a piston ring, is equally applicable to any situation in which a resilient packing ring of the same class may be employed.

Reference should be had to the accompanying drawings, in which

Figure 1:
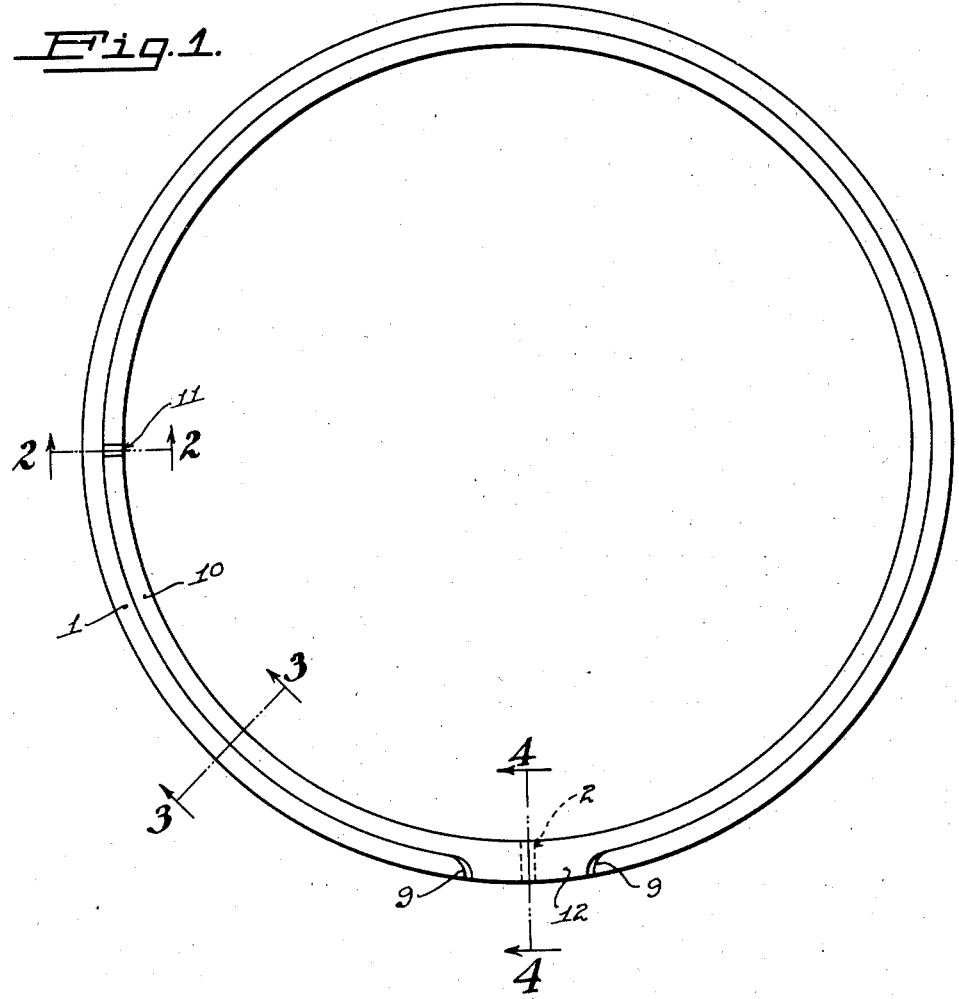
Fig. 1 is a plan view of my packing ring in its natural or expanded position.
Figure 2:
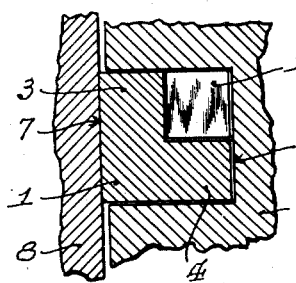
Figs. 2, 3 and 4 are sections, enlarged, on the respective lines 2—2, 3—3, 4—4 of Fig. 1, showing also portions of the cylinder wall and piston.
Figure 3:
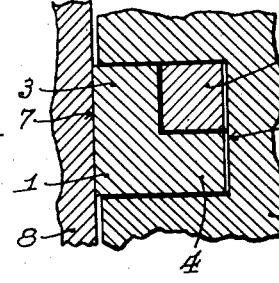
Figure 4:
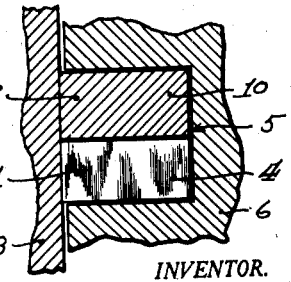

In the drawings the reference numeral 1 designates a ring, hereinafter referred to as the outer ring, which has a joint 2 at one point in its circumference. This outer ring is of substantially L-shaped cross section, as shown in Figs. 2 and 3, having an outer, or as it may be termed for convenience, a vertical flange 3 and a lateral or horizontal flange 4. The vertical flange 3 fills the entire width of the groove 5 in the piston 6, except for the necessary clearance, and its outer flat face 7 bears against the wall of the cylinder 8. The vertical flange 3 terminates a short distance from the joint 2, as shown in Fig. 1, and its ends 9 are rounded or chamfered on the inside, as shown.

An inner ring 10 lies within the interior angle of the outer ring, the two forming, in effect, a composite ring of approximately square cross section. A joint 11 is provided in the inner ring 10, and is positioned preferably 90 degrees from the joint 2 of the outer ring. A lug 12 is formed upon the outer face of the inner ring, and projects into and fills the space between the ends 9 of the vertical flange of the outer ring. This lug overlies the joint 2 in the horizontal flange of said outer ring, and has the double function of sealing said joint and of preserving the 90 degree relation between the two rings.

Both rings are formed circular and concentric, and of diameters slightly greater than those which they assume when compressed inside the cylinder, the joints 2 and 11 being wide enough initially to permit such compression. Although each ring, if compressed separately, would assume the form of an ellipse, with its major axis running through the joint, when the two are compressed together they assume practically a circular form, due to the 90 degree relation between the said major axes, and as a result the outward pressure upon the cylinder wall is practically uniform. This obviates the necessity for hammering or other distortion, with its consequent objectionable effect on the internal stresses of the metal.

Each of the two rings should have approximately the same total stiffness or resilience, so that the 90 degree relation of their joints will result in uniform outward pressure and practically true circular form when compressed. On account of the difference in cross sectional dimensions, the inner ring should be made of stiffer material than the outer, the difference in unit stiffness or resilience depending, of course, upon the difference in cross sectional dimensions, both factors being so proportioned as to make the total stiffness or resilience of two rings equal. In the case of metal rings, this can be accomplished, for example, by making the outer ring of cast iron, and the inner ring of a suitable heat treated iron or steel having greater stiffness.

The fact that the outer surface 7 of the ring 1 provides the only surface in contact with the cylinder wall is an important advantage. It minimizes the opportunity for carbon and excessive lubricating oil to work in through the ring joints and around the rings to fill up the groove. In addition it prevents mechanical damage by protecting the relatively small inner ring. Only the relatively large outer portion is subjected to extensive stresses, and since its dimensions are ample, it is capable of withstanding them without any distortion, which, in addition to the above, minimizes wear in the groove. Furthermore, the protection thus provided for the inner ring, together with the strength of the outer ring, provides ample means for maintaining the mechanical arrangement of these two rings and preserves their freedom of movement.

It should also be noted that the position of the lug 12 of the inner ring over-lying the joint 2 in the lower portion of the outer ring provides a seal for said joint which minimizes gas leakage therethrough, the only possible leakage paths being very small and tortuous.

I claim:

1. A spring packing ring comprising an outer ring member of substantially L-shaped cross section formed by two angularly related flanges, one of said flanges providing the outer bearing face of the ring, and an inner ring member positioned within the interior angle of said outer member, each of said members having a substantially transverse joint permitting radial contraction and expansion, said joints being angularly separated and the outer flange of said outer member terminating short of the joint therein; and a lug formed upon said inner member and projecting into the space between the ends of the outer flange of said outer member, said lug bridging the joint in the other flange of said outer member.

2. A spring packing ring comprising an outer ring member of substantially L-shaped cross section positioned with one of its flat faces outermost, an inner ring member positioned within the interior angle of said outer member, each of said members having substantially equal total resilience, and each being formed with a joint permitting radial contraction and expansion, and means for maintaining said joints separated by a predetermined angular distance.

3. A spring packing ring comprising an outer ring member and an inner ring member fitted therewithin and differing therefrom in cross sectional dimensions and unit resilience, said cross sectional dimensions and unit resilience being so related as to provide said members with substantially equal total resilience, and each of said members having a joint permitting radial contraction and expansion, said joints being so positionally related as to cause the assembled ring to have uniform resistance to radial compression throughout its circumference.

In testimony whereof I have signed my name to this specification.

JAMES A. CRONIN.